United States Patent
May (10) Patent No.: US 8,185,719 B2
(45) Date of Patent: *May 22, 2012

(54) MESSAGE ROUTING SCHEME FOR AN ARRAY HAVING A SWITCH WITH ADDRESS COMPARING COMPONENT AND MESSAGE ROUTING COMPONENT

(75) Inventor: Michael David May, Bristol (GB)

(73) Assignee: XMOS Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,690

(22) Filed: Nov. 18, 2010

(65) Prior Publication Data

US 2011/0066825 A1 Mar. 17, 2011

Related U.S. Application Data

(63) Continuation of application No. 11/717,621, filed on Mar. 14, 2007, now Pat. No. 7,962,717.

(51) Int. Cl.
*G06F 15/00* (2006.01)
(52) U.S. Cl. .................. 712/16; 712/10; 712/11
(58) Field of Classification Search ............ 712/10, 712/11, 16
See application file for complete search history.

(56) References Cited

U.S. PATENT DOCUMENTS

| | | | |
|---|---|---|---|
| 4,651,318 A | 3/1987 | Luderer | |
| 4,661,947 A | 4/1987 | Lea et al. | |
| 4,679,189 A | 7/1987 | Olson et al. | |
| 4,893,303 A | 1/1990 | Nakamura | |
| 5,008,882 A | 4/1991 | Peterson et al. | |
| 5,140,583 A | 8/1992 | May et al. | |
| 5,422,881 A | 6/1995 | May et al. | |
| 5,430,729 A | 7/1995 | Rahnema | |
| 5,539,739 A | 7/1996 | Dike et al. | |
| 5,602,839 A | 2/1997 | Annapareddy et al. | |
| 5,737,628 A | 4/1998 | Birrittella et al. | |
| 5,892,923 A | 4/1999 | Yasuda et al. | |
| 5,926,101 A | 7/1999 | Dasgupta | |

(Continued)

FOREIGN PATENT DOCUMENTS

EP 0501525 A2 9/1992

OTHER PUBLICATIONS

International Search Report and Written Opinion, dated Jun. 19, 2008.

*Primary Examiner* — Idriss N Alrobaye
(74) *Attorney, Agent, or Firm* — Sughrue Mion, PLLC (57) ABSTRACT

Each possessor node in an array of nodes has a respective local node address, and each local node address comprises a plurality of components having an order of addressing significance from most to least significant. Each node comprises: mapping means configured to map each component of the local node address onto a respective routing direction, and a switch arranged to receive a message having a destination node address identifying a destination node. The switch comprises: means for comparing the local node address to the destination node address to identify a the most significant non-matching component; and means for routing the message to another node, on the condition that the local node address does not match the destination node address, in the direction mapped to the most significant non-matching component.

32 Claims, 10 Drawing Sheets

U.S. PATENT DOCUMENTS

| | | |
|---|---|---|
| 6,046,978 A | 4/2000 | Melnik |
| 6,230,252 B1 | 5/2001 | Passint et al. |
| 6,353,873 B1 | 3/2002 | Melchior |
| 6,542,473 B1 | 4/2003 | Song |
| 6,643,764 B1 | 11/2003 | Thorson et al. |
| 7,027,413 B2 | 4/2006 | Lee et al. |
| 7,349,981 B2 | 3/2008 | Guerrero |
| 2002/0018470 A1* | 2/2002 | Galicki et al. ............... 370/392 |
| 2003/0031126 A1* | 2/2003 | Mayweather et al. ........ 370/223 |
| 2004/0250046 A1* | 12/2004 | Gonzalez et al. ............... 712/11 |
| 2005/0013308 A1* | 1/2005 | Wybenga et al. ............. 370/396 |
| 2005/0138322 A1* | 6/2005 | Guerrero ....................... 711/220 |
| 2008/0244230 A1* | 10/2008 | Burger et al. ................. 712/206 |
| 2010/0250784 A1* | 9/2010 | Henry et al. .................. 709/252 |

* cited by examiner

MESSAGE ROUTING SCHEME FOR AN ARRAY HAVING A SWITCH WITH ADDRESS COMPARING COMPONENT AND MESSAGE ROUTING COMPONENT

This is a Continuation of application Ser. No. 11/717,621 filed Mar. 14, 2007, the contents of all of which are incorporated herein by reference in their entirety.

FIELD OF THE INVENTION

The present invention relates to routing messages between processors, and particularly to a scheme or protocol for routing messages between the nodes of a processor array.

BACKGROUND OF THE INVENTION

Figure 1:
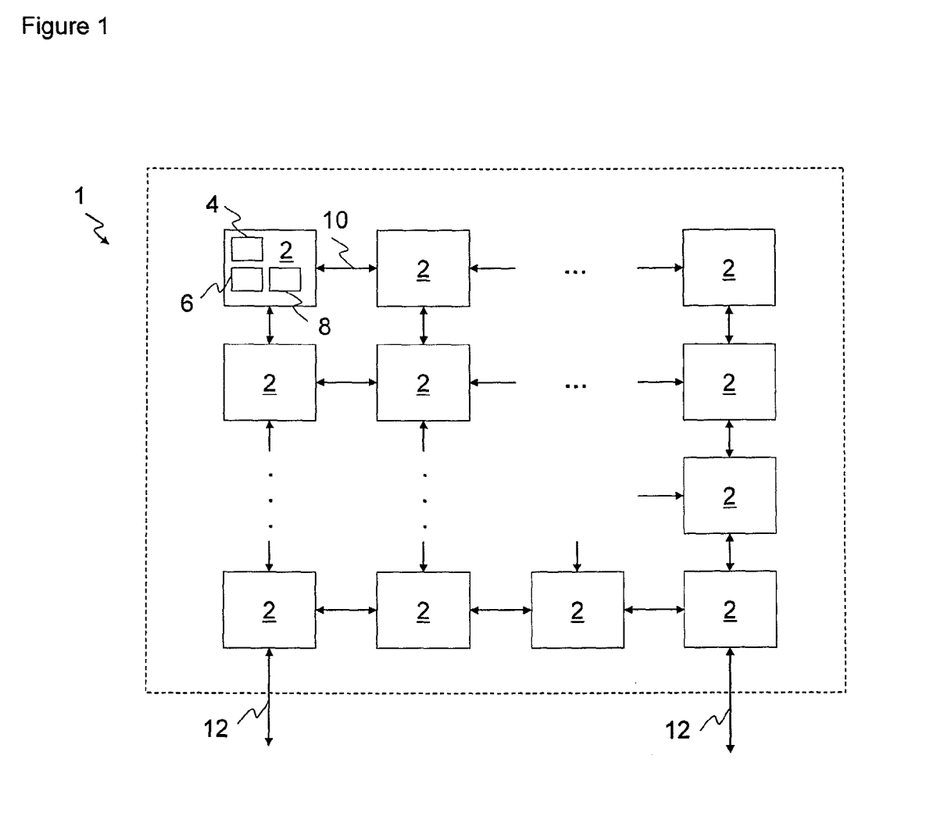
FIG. 1 shows an example of a processor array.

As illustrated in FIG. 1, an integrated circuit 1 can be constructed as an array of processor tiles 2, each tile comprising a respective processor 4, memory 6 and communications 8. The tiles 2 are connected via interconnects 10 which transport data and control information throughout the chip 1. A small number of tiles on the chip are coupled to external devices via external connections 12. Alternatively, or additionally, processors on different chips can be arrayed together to form a circuit.

The advantage of this architecture is that, by linking together a number of smaller modular processors at the design stage, a manufacturer can easily create a chip or circuit having a particular performance depending on the processing and memory requirements for the application or device in question, as well as on their particular cost, power and area targets.

However, there is also a difficulty in routing messages throughout the array. The messages may be delayed, may not be routed by the most efficient route, or may become deadlocked. Further, in large arrays the routing protocol may be complicated and unwieldy.

SUMMARY

According to one aspect of the present invention, there is provided an array of processor nodes, each node having a respective local node address identifying it within the array, each local node address comprising a plurality of components having an order of addressing significance from most to least significant, and each node comprising: mapping means configured to map each component of the local node address onto a respective routing direction; and a switch arranged to receive a message having a destination node address identifying a destination node, the switch comprising: means for comparing the local node address to the destination node address to identify the most significant non-matching component; and means for routing the message to another node, on the condition that the local node address does not match the destination node address, in the direction mapped to the most significant non-matching component of the local node address by the mapping means. Preferably, but not necessarily, each of said components is a bit.

Surprisingly, the inventors have discovered that by mapping routing directions onto the bits of node addresses, it is possible to provide an efficient, fast, easy-to-implement and deadlock-free protocol for routing messages throughout an n-dimensional processor array. In a further advantage, this same simple scheme works for arrays of any size having any number of dimensions.

In embodiments, the switch may be configured to perform said comparison one bit at time, and to halt the comparison upon encountering the most-significant non-matching bit. The destination node address may be the earliest part of the message to be received by the switch. The destination node address may be received by the switch in order from most-significant bit to least-significant bit.

These embodiments are particularly advantageous because, at many nodes, the switch need only read the earliest few bits of the message before forwarding it to another node. This technique facilitates extra fast "wormhole routing" whereby the address can be acted upon before the rest of the message even arrives. Thus the switch can quickly set up the routing of the message with minimal delay.

The mapping means may comprise a routing look-up table. The routing look-up table may be soft programmable. The mapping means may comprise a routing algorithm.

The nodes may be arranged in an array of at least two-dimensions, at least three-dimensions, or at least four-dimensions.

Each node may comprise at least one local processor, and the switch may be configured to route the message to one of the local processors on the condition that the local node address matches the destination node address. The switch may be configured to discard the destination node address once a match is detected and before routing the message to a processor.

At least one node may comprise a plurality of processors, the message may further comprise a destination processor address identifying a destination processor within the node, and the switch may be configured to route the message to the destination processor on the condition that the destination node address matches the local node address. The switch may be configured to discard the destination processor address before routing the message to the destination processor.

At least one processor at least one node may comprise a plurality of I/O channels, the message may further comprise a destination channel address identifying a destination channel within the processor, and the switch may be configured to route the message to the destination channel on the condition that the destination node address matches the local node address.

The switch may be configured to discard one or more bits from the destination node address once those bits match with the local node address. For example, a node address portion relating to a particular dimension may be discarded as the location of the message is narrowed down to a specific coordinate within that dimension.

According to another aspect of the present invention, there is provided a method of routing messages in an array of processor nodes, each node having a respective local node address identifying it within the array, and each local node address comprising a plurality of components having an order of addressing significance from most to least significant, the method comprising: receiving at a node a message comprising a destination node address; comparing the local node address to the destination node address to identify the most significant non-matching component; and on the condition that the local node address does not match the destination node address, consulting a mapping means which maps each component of the local node address onto a respective routing direction, and routing the message to another node in the direction mapped to the most-significant non-matching component of the local node address by the mapping means.

According to another aspect of the invention, there is provided a method of routing messages between the nodes of an n-dimensional processor array, where n is an integer, the method comprising: determining the number of dimensions n in the array; determining the maximum extent L(k) of the array in each of the dimensions k=1 ... n, where L is measured in number of nodes; along each of the dimensions k=1 ... n, defining coordinates numbered sequentially in binary, the coordinates covering a length of at least L(k), such that each node is described by a respective coordinate in each of the n dimensions; allocating an address portion of m(k) bits for addressing each node along each dimension k=1 ... n, such that $2^{m(k)} \geq L(k)$, and storing the node's coordinate along each dimension k in the respective m(k)-bit address portion; and for each address portion of each node in the array, mapping a respective first direction onto any bits of value zero and a respective second direction onto any bits of value one; and routing messages by reference to a plurality of said addresses and said directions.

According to another aspect of the invention, there is provided a computer program product for allocating addresses to the nodes of an n-dimensional processor array, where n is an integer, the computer program comprising code for performing steps of: determining the number of dimensions n in the array; determining the maximum extent L(k) of the array in each of the dimensions k=1 ... n, where L is measured in number of nodes; along each of the dimensions k=1 ... n, defining coordinates numbered sequentially in binary, the coordinates covering a length of at least L(k), such that each node is described by a respective coordinate in each of the n dimensions; allocating an address portion of m(k) bits for addressing each node along each dimension k=1 ... n, such that $2^{m(k)} \geq L(k)$, and storing the node's coordinate along each dimension k in the respective m(k)-bit address portion; and for each address portion of each node in the array, mapping a respective first direction onto any bits of value zero and a respective second direction onto any bits of value one.

DETAILED DESCRIPTION

For a better understanding of the present invention and to show how the same may be carried into effect, reference will now be made, by way of example, to the corresponding drawings in which.

Figure 2:
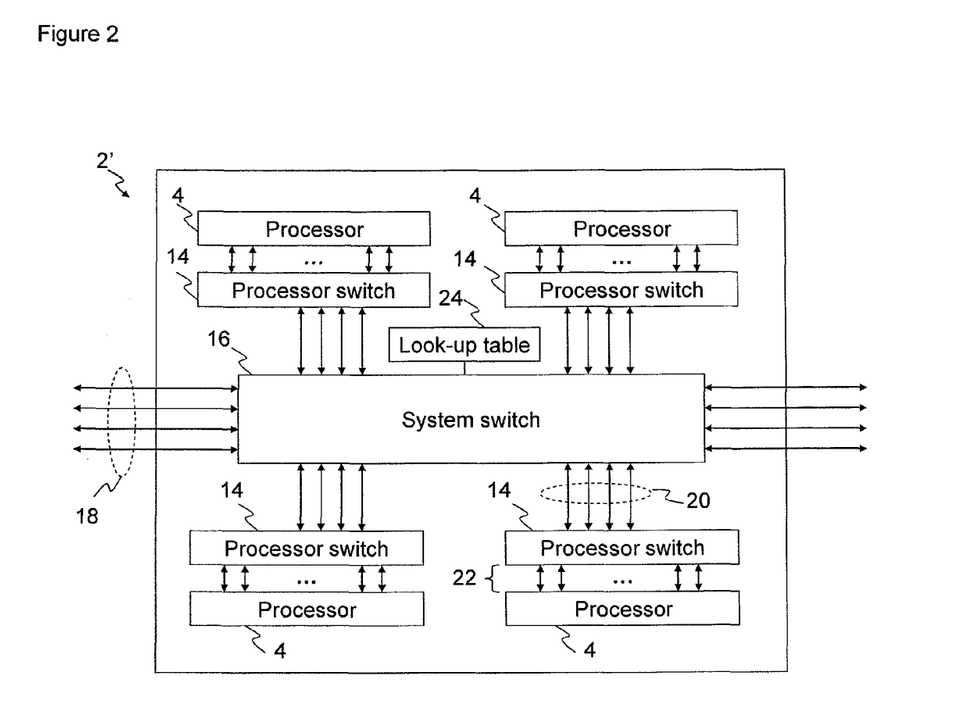
FIG. 2 is a schematic representation of a processor node.

FIG. 2 illustrates schematically a processor tile 2' according to an exemplary embodiment of the invention. A plurality of such tiles are arranged together into a combined structure or array, with each tile 2' in the array comprising a system switch 16 and a plurality of bidirectional system links 18 which each link to another tile in the array. Some or all of the system links 18 may each link in a respective direction to a respective other processor, and/or some of the system links 18 may link in the same direction to the same processor so that a group of system links 18 can effectively be treated as one link with a larger capacity. The system links 18 may either be on-chip or inter-chip. Each system switch 16 defines a node in the array.

In this example, the tile 2' comprises four processors 4. Each processor 4 may have a number of different I/O channels accessible via bidirectional channel links 22 and a processor switch 14. The processor switches are connected to the system switch by one or more bidirectional processor links 20. The tile 2' also comprises a routing look-up table accessible by the system switch 16, as discussed in more detail later. The tile 2' may further comprise external links and memory such as RAM and ROM (not shown).

Figure 3:
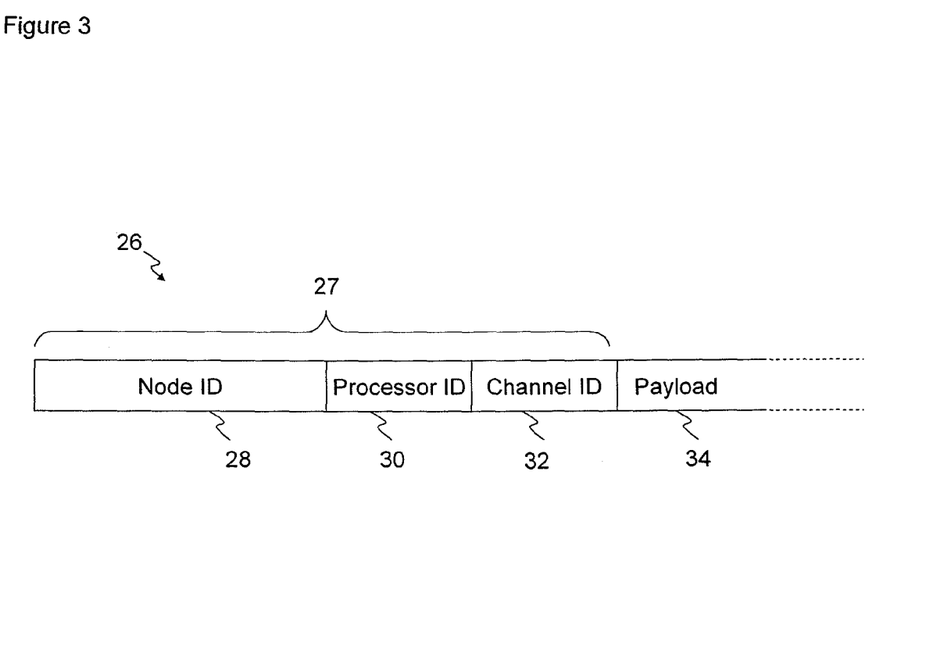
FIG. 3 shows a message format suitable for routing.

In operation, the system switch 16 receives an incoming message 26, either from one of the local processors (i.e. a processor of the same node) or from a processor of a different node. Each node is allocated an address identifying it within the array, each processor is allocated an address identifying it within the respective node, and each channel is allocated an address identifying it within the respective processor. Addresses comprise component quanta of address data, in most cases individual bits. As illustrated schematically in FIG. 3, the message includes a header 27 comprising a destination node portion 28 which specifies a destination node address, a destination processor portion 30 which specifies a destination processor address, and destination channel portion 32 which specifies a destination channel address. The message also includes a payload 34. In a preferred embodiment, the header is two bytes (sixteen bits) long, with an eight-bit destination node portion, four-bit destination processor portion, and four-bit destination channel portion. This allows up to 256 nodes, 4096 processors and 65536 channels, each node with sixteen processors and each processor with sixteen channels The system switch 16 compares its local node address (i.e. its own node address) with the destination node address of the message. If there is a match, the system switch examines the destination processor address of the message and routes it to the corresponding processor switch 14. The processor switch 14 then examines the destination channel address of the message and routes it to the corresponding channel. Note that the header 27 may be discarded before the message is finally sent to a processor 4 so that the receiving software advantageously never need see the header. The header may be discarded in portions so that the node address portion 28 and processor address portion are discarded before the message is routed to a processor switch 14, and the channel address portion 32 is discarded after the message is routed to the processor switch 14 but before the message is routed to a processor 4.

If there is no match however, the system switch 16 has received a message destined for another node and must decide which direction to forward it in, i.e. on which system link 18 to retransmit the message and therefore which node should receive it next. Bear in mind that the array may comprise tens, hundreds, or even thousands of nodes and so a message may have to be relayed between numerous nodes before reaching its destination. Therefore finding the most efficient route throughout the array is not a straightforward task.

According to the present invention, this is achieved by consulting the look-up table 24. The look-up table 24 comprises a plurality of possible routing directions tabulated against the bits of the local node address, with one direction mapped to each respective bit. On the basis of the comparison between the node's local address and the message's destination address, the system switch 16 identifies a non-matching bit and refers to the look-up table 24 to determine which direction maps onto that bit.

Preferably the look-up table is soft-programmable, so that a customer can combine together any number of processors in a modular fashion, and then program the routing as necessary. Alternatively, if the array is pre-designed by the supplier, the look-up tables could instead be hard-programmed for that array.

Only one look-up table is shown in FIG. 2, but in embodiments a plurality of such look-up tables may be provided on each node. For example, there may be one look-up table per system link. This advantageously accelerates message routing because message competition for look-up table resources is reduced, thus allowing multiple messages to be routed simultaneously.

In a particularly advantageous embodiment, the system switch 16 compares the local node address with the destination node address bit-by-bit, i.e. one bit at a time, and halts the comparison as soon as the earliest non-matching bit is found. This makes the routing particularly fast, because at most nodes the system switch 16 need only read a small portion of the message's destination address before forwarding it to another node. Sometimes the switch need only read a single bit. Preferably, the system switch 16 begins by comparing the most significant bits, then the next significant bits, and so forth, until a mismatch is found. In a preferred embodiment, the most significant bit of the destination node address is placed right at the beginning of the header 27, so that the routing direction can often be determined by reading only the earliest few bits of the message, and sometimes even by reading only the very first bit.

This technique facilitates extra fast "wormhole routing" whereby the address can be acted upon before the rest of the message even arrives. Thus the system switch 16 can quickly set up the routing of the message with minimal delay.

Figure 4:
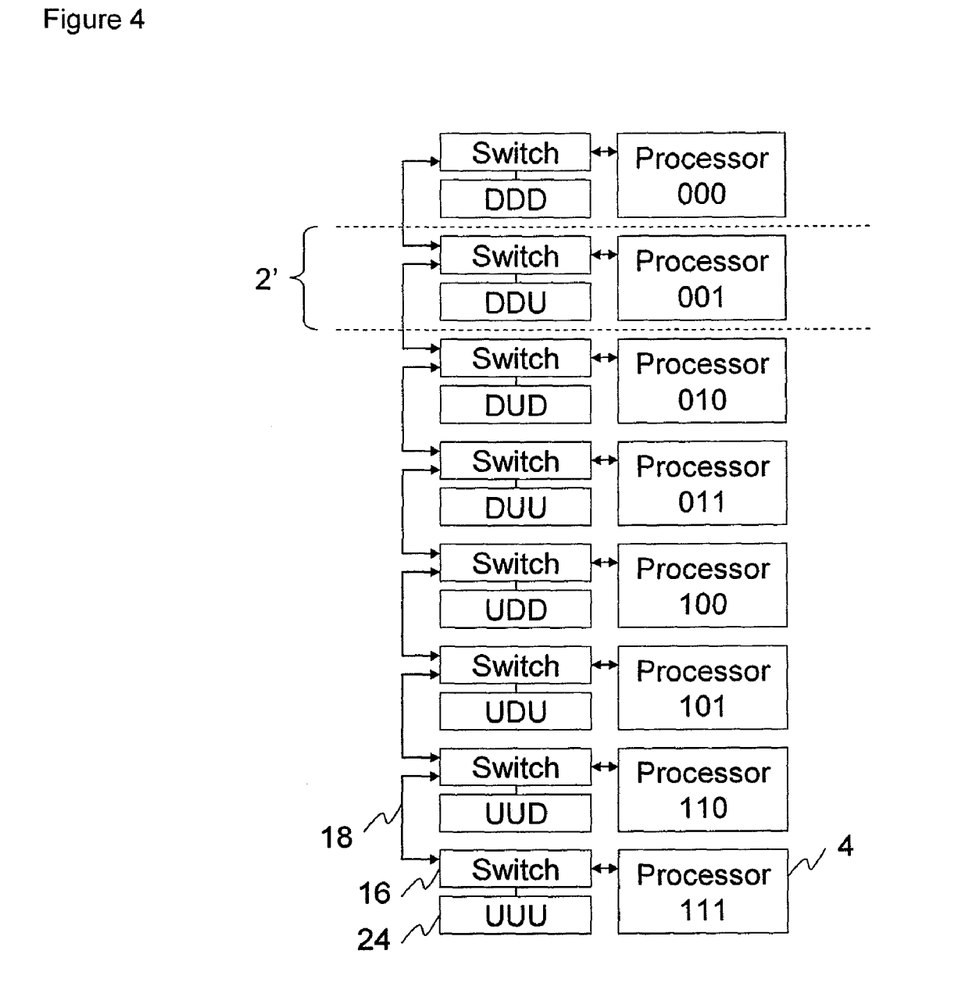
FIG. 4 shows a one-dimensional processor array.

The use of the routing look-up table is explained in further detail with reference to the example of FIG. 4, which illustrates schematically a simple one-dimensional array according to an embodiment of the invention.

In this example, each tile 2' comprises only a single processor 4, so the processor address is effectively the same as the node address. Each tile also comprises a routing look-up table 24 and a system switch 16. Further, since the array is one-dimensional, each tile 2' connects with at most two system links 18. For brevity, details such as processor switches 14, processor links 20 and channel links 22 are not included.

In order to accommodate eight nodes, each node is allocated a three bit address. Accordingly, each of the look-up tables 24 has three entries, one for each bit of the node address. Each entry may specify one of the two possible routing directions, up (U) and down (D). The look-up tables are as follows:

| Node | Node Address | Look-Up Table |
|---|---|---|
| N1 | 000 | DDD |
| N2 | 001 | DDU |
| N3 | 010 | DUD |
| N4 | 011 | DUU |
| N5 | 100 | UDD |
| N6 | 101 | UDU |
| N7 | 110 | UUD |
| N8 | 111 | UUU |

So in this example, the most significant bit identifies a specific half of the array. Within a given half, the second most significant bit then identifies a specific quarter of the array; and within a given quarter, the least significant bit narrows down to a specific node. Therefore if a message begins in the wrong half, the relevant system switch 16 can discover so by only a single comparison between the most significant bits of the destination and the local addresses. Referring to the look-up table 24, the system switch then determines which direction maps onto the most significant bit and therefore in which direction to route the message in order to move it towards the correct half. Once the message is in the correct half, the relevant system switch 16 must perform at least two comparisons, one between the most significant bits and one between the second most significant bits. The comparison between the second most specific bits tells the system switch 16 whether the message is in the wrong quarter, and if so, in which direction it needs to route the message in order to move it towards the correct quarter. A similar principle then applies for finding the final destination node using the least significant bit once the message has been routed to the correct quarter.

For illustrative purposes, consider routing a message from node N7 to node N2. At each of the nodes N7, N6 and N5, the system switch compares only the most significant bits and, because they don't match, refers to the look-up table 24 to determine that the message should be routed upwards. Note therefore that at nodes N7-N5 the message can be speedily routed by examining only a single bit of the received message. At nodes N4 and N3, the system switch 16 must resort to comparing the second most significant bits to determine that the message should still be routed upwards, until it arrives at the destination node N2.

Note of course that the order in which the most to least significant bits are named is generally only a matter of convention. However, for the purpose of this invention, the meaning of "significant" is linked to the nodes' positions within the array, so the most significant bit divides the array into two portions, the next significant bit sub-divides each of those portions into two sub-portions, and so forth. That is to say, the order of significance of the address bits from most to least significant corresponds to increasingly narrow spatial divisions of the array. The order of significance does not mean the order in which the bits are arranged in the address portion of the message, nor the order in which they are arranged in any memory or such like. Such factors are not essential to the invention (although as discussed above, in preferred embodiments the most significant bit is placed at the beginning of the header 27). Purely for the purpose of the present text, the most to least significant bits are taken to read from left to right.

Figure 5:
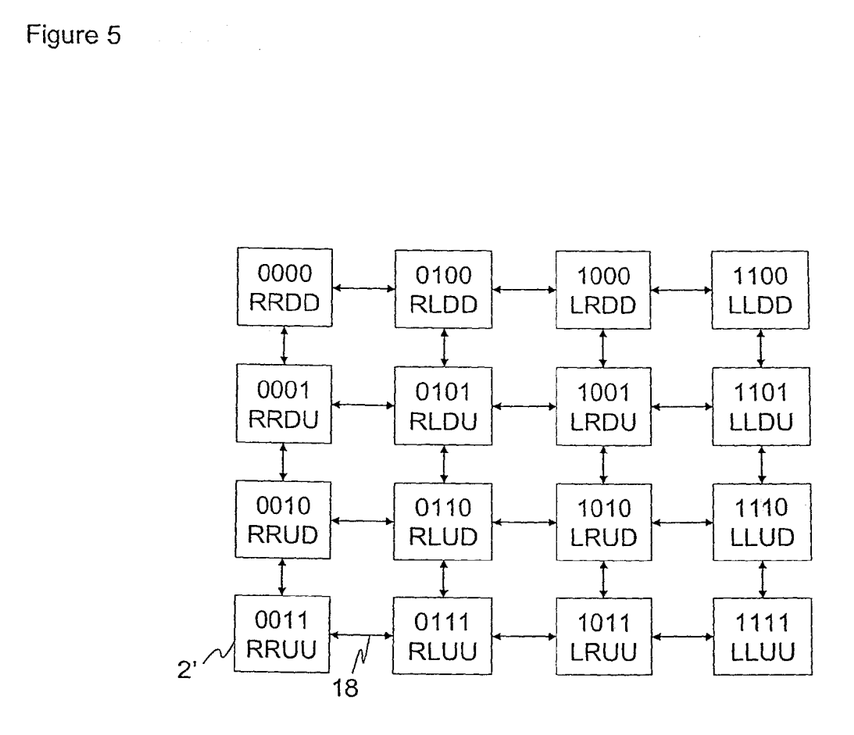
FIG. 5 shows a two-dimensional 4×4 processor array.

The speed and simplicity of the scheme is particularly advantageous in more complex multi-dimensional arrays. FIG. 5 illustrates schematically an example of the present invention extended to a 4×4 two-dimensional array. For convenience, each tile 2' is shown only with its respective system links 18 and its respective node address 0000 to 1111.

Each node address can be considered to comprise two distinct portions: a portion specifying a coordinate in the left-right direction, and a coordinate specifying an address in the up-down direction. In this example, the two most significant bits count 00, 01, 10, 11 from left to right in the array, and the two least significant bits count 00, 01, 10, 11 from top to bottom in the array. The routing look-up table thus maps two additional directions, left (L) and right (R), onto the node addresses. The look-up tables of each node are as follows:

| Node | Node Address | Look-Up Table |
|---|---|---|
| N1 | 0000 | RRDD |
| N2 | 0001 | RRDU |
| N3 | 0010 | RRUD |
| N4 | 0011 | RRUU |
| N5 | 0100 | RLDD |
| N6 | 0101 | RLDU |
| N7 | 0110 | RLUD |
| N8 | 0111 | RLUU |

-continued

| Node | Node Address | Look-Up Table |
|---|---|---|
| N9 | 1000 | LRDD |
| N10 | 1001 | LRDU |
| N11 | 1010 | LRUD |
| N12 | 1011 | LRUU |
| N13 | 1100 | LLDD |
| N14 | 1101 | LLDU |
| N15 | 1110 | LLUD |
| N16 | 1111 | LLUU |

In operation, the system switch 16 first receives a message and compares the most significant bit of its destination node address with the most significant bit of the local node address. By determining whether or not the most significant bits match, this tells the switch 16 whether the message is in the correct half of the array in the left-right direction, i.e. whether it is in the leftmost two columns or the rightmost two columns. If not, the look-up table tells the switch which direction to route in order to forward the message towards the correct half, by means of the routing direction mapped to the most significant bit. Once in the correct half, the second most significant bit then narrows down to the correct column. Once in the correct column, the same process applies with regard to the least significant two bits in the up-down direction.

Note that it is only a matter of terminology as to which dimension's address bits are considered the most and least significant. That is, the invention could equally well read the bits specifying the up-down direction first in order to find the correct row for the message, and then subsequently read the pair in the left-right direction to narrow down to the correct column. For the purpose of this application, the most significant dimension is considered simply as that of the first address portion to be used, and the least significant dimension is that of the last portion to be used. Bits from the different dimensions' portions could also be used and/or arranged in an interleaved fashion. These and other variations do not prejudice the basic principle that, in substance, the order of significance of the address bits from most to least significant means an order of increasingly narrow spatial divisions of the array.

Figure 6:
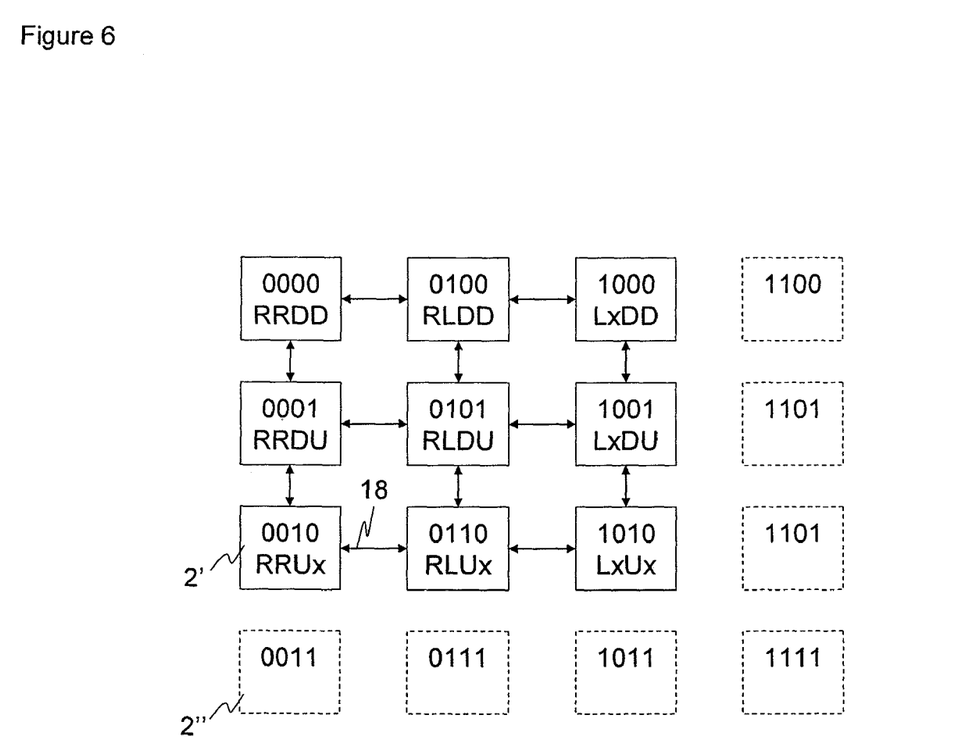
FIG. 6 shows a two-dimensional 3×3 processor array.

FIG. 6 shows schematically an example of a 3×3 two-dimensional array. Again for convenience, each tile 2' is shown only with its respective system links 18 and its respective node address 0000 to 1010. This example illustrates how the invention can be used to provide routing in irregular arrays or arrays not having conveniently sized sides of length $2^n$ (where n is an integer). Purely for illustrative purposes, the imaginary positions 2" of redundant node address are also shown. The look-up tables for the 3×3 array are as follows:

| Node | Node Address | Look-Up Table |
|---|---|---|
| N1 | 0000 | RRDD |
| N2 | 0001 | RRDU |
| N3 | 0010 | RRUx |
| N4 | 0100 | RLDD |
| N5 | 0101 | RLDU |
| N6 | 0110 | RLUx |
| N7 | 1000 | LxDD |
| N8 | 1001 | LxDU |
| N9 | 1010 | LxUx |

The addresses and look-up tables of the existing nodes 2' are the same as the corresponding nodes in the 4×4 array of FIG. 5, except that due to the redundant node addresses, some entries in the look-up table effectively become "don't cares" (x) since there is no situation in which they could possibly be consulted. Thus it can be seen how a 3×3 array can be effectively "cut out" from a 4×4 grid. The same principle can be used to address irregularly shaped arrays.

Figure 7:
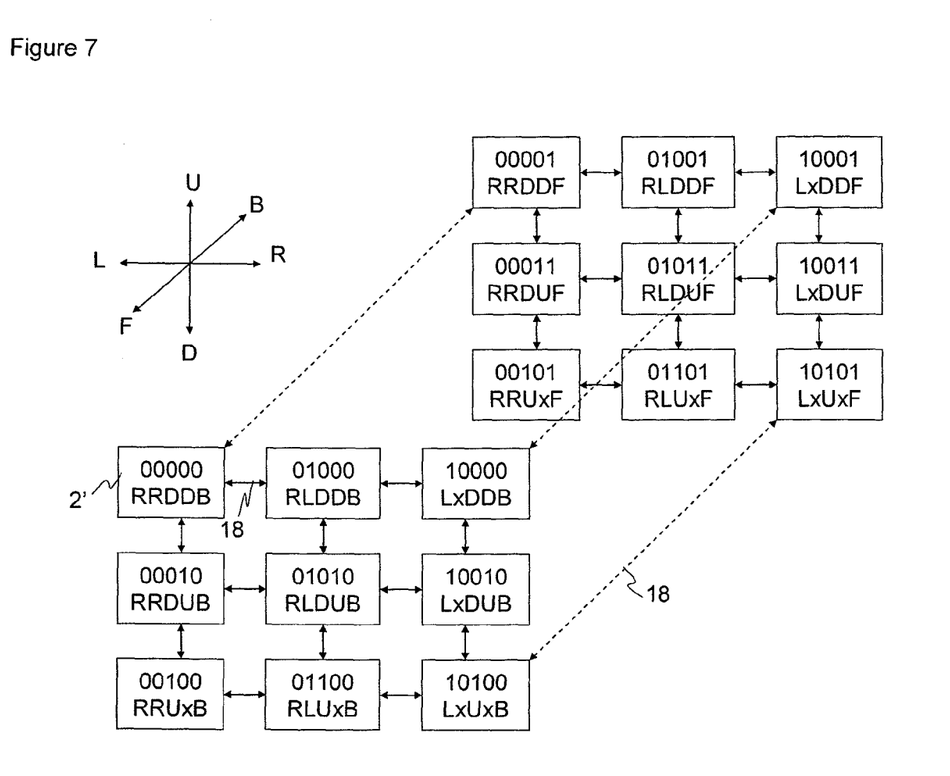
FIG. 7 shows a three-dimensional 3×3×2 processor array.

FIG. 7 illustrates an example of the present invention extended to a 3×3×2 three-dimensional array. This creates two new directions, forwards (F) and backwards (B). The principle of the invention is exactly the same, with an extra bit appended to the node addresses to specify the nodes' positions in the backwards-forwards direction. The look-up tables are as follows:

| Node | Node Address | Look-Up Table |
|---|---|---|
| N1 | 00000 | RRDDB |
| N2 | 00010 | RRDUB |
| N3 | 00100 | RRUxB |
| N4 | 01000 | RLDDB |
| N5 | 01010 | RLDUB |
| N6 | 01100 | RLUxB |
| N7 | 10000 | LxDDB |
| N8 | 10010 | LxDUB |
| N9 | 10100 | LxUxB |
| N10 | 00001 | RRDDF |
| N11 | 00011 | RRDUF |
| N12 | 00101 | RRUxF |
| N13 | 01001 | RLDDF |
| N14 | 01011 | RLDUF |
| N15 | 01101 | RLUxF |
| N16 | 10001 | LxDDF |
| N17 | 10011 | LxDUF |
| N18 | 10101 | LxUxF |

So in operation, the message is first routed to the correct column and row as described in relation to FIGS. 5 and 6. The system switch 16 then resorts to comparing the least significant bits of the local and destination addresses. This tells the switch 16 whether the message is in the correct plane (i.e. front or back). If not, the switch 16 refers to the routing table to determine in which direction to route the message in order to get to the correct plane.

According to one embodiment of the invention, a node address portion relating to a particular dimension may be discarded as the location of the message is narrowed down to a specific coordinate within that dimension. So referring for example to the array of FIG. 7, once the message has been routed to the correct column the first and second most significant bits are no longer needed and may be discarded. Similarly, once the message has been routed to the correct row then the third and fourth most significant bits are no longer needed and may be discarded.

Individual bits may even be discarded as the message is routed, i.e. by discarding the most significant bit once matched, then discarding the second most significant bit once that is matched, and so forth.

Discarding portions or individual bits from the destination address improves routing speed because the number of required bit comparisons is reduced. But in order to allow this discarding of portions or bits, some method must be implemented for routing the message based on the shortened address. One way to achieve this is to provide separate look-up tables 24 for each system link 18, with bits being stripped away from the look-up tables of certain links. For example, referring again to the example of FIG. 7, if the message is first routed in the left-right direction then the links 18 in the up-down and forwards-backwards directions do not need any bits for comparing the first two most significant bits of the original address. Similarly, if that message is subsequently routed in the up-down direction, then the look-up tables of the forward-backward links 18 need only contain a single bit. This also reduces the size of some of the look-up tables, saving resources.

The invention can also be extended into four or more dimensions. Of course, the array still exists in three spatial dimensions—the term "dimension" here means simply a "degree of freedom". So for an array having four or more dimensions, at least one node in the array links to four or more other nodes. This means there are four or more possible directions in which the message can be routed.

Figure 8:
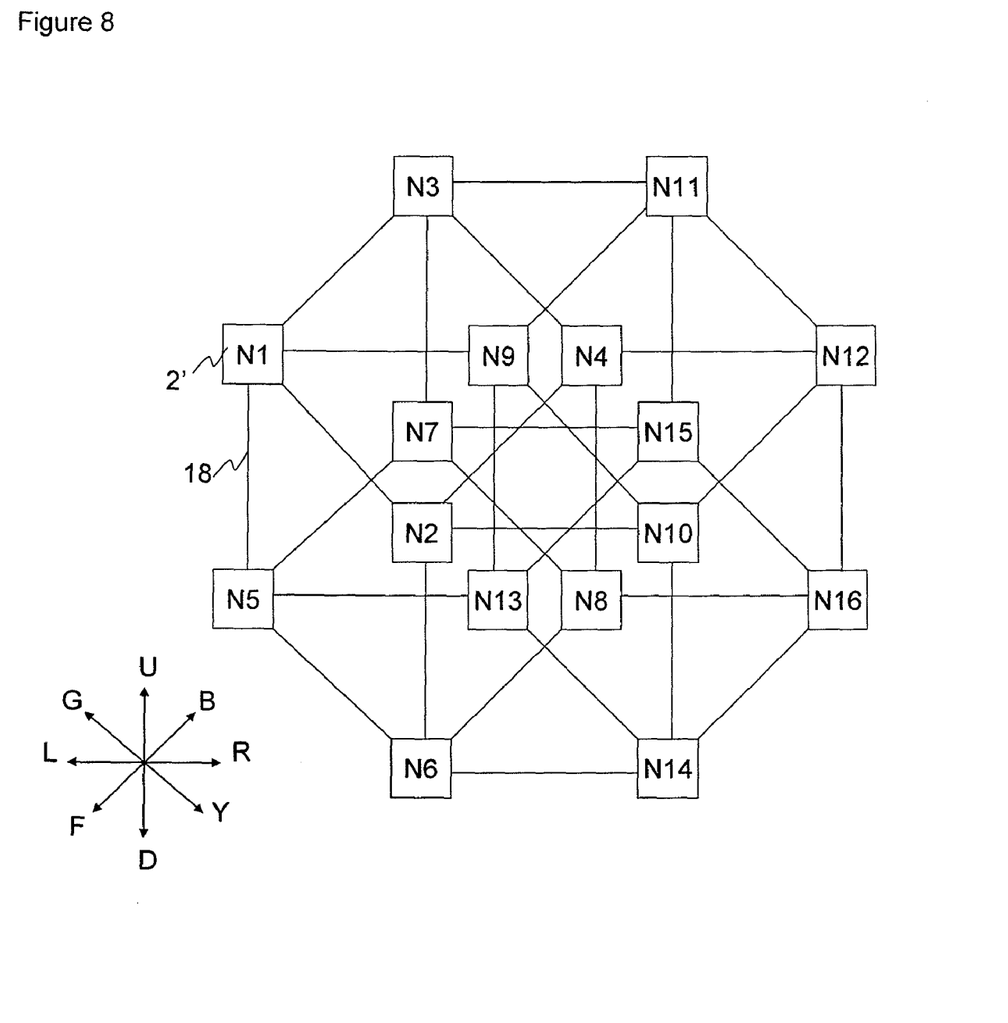
FIG. 8 shows a four-dimensional 2×2×2×2 processor array.

FIG. 8 shows an example of the invention extended to a 2×2×2×2 four-dimensional hypercube, known as an octachoron. Each node N1 . . . N16 is connected to four other nodes, so at any given node there are four degrees of freedom in routing the message.

As in the example of FIG. 7, there are the three degrees of freedom left-right, up-down, and forwards-backwards. The example of FIG. 8 then provides additional links 18 to add a fourth degree of freedom for routing messages. As a matter of arbitrary terminology, the two new directions created are referred to here as yellow (Y) and green (G), yellow being the opposite direction to green. The routing tables at each node are as follows:

| Node | Node Address | Look-Up Table |
|---|---|---|
| 1 | 0000 | R D B Y |
| 2 | 0001 | R D B G |
| 3 | 0010 | R D F Y |
| 4 | 0011 | R D F G |
| 5 | 0100 | R U B Y |
| 6 | 0101 | R U B G |
| 7 | 0110 | R U F Y |
| 8 | 0111 | R U F G |
| 9 | 1000 | L D B Y |
| 10 | 1001 | L D B G |
| 11 | 1010 | L D F Y |
| 12 | 1011 | L D F G |
| 13 | 1100 | L U B Y |
| 14 | 1101 | L U B G |
| 15 | 1110 | L U F Y |
| 16 | 1111 | L U F G |

Figure 9:
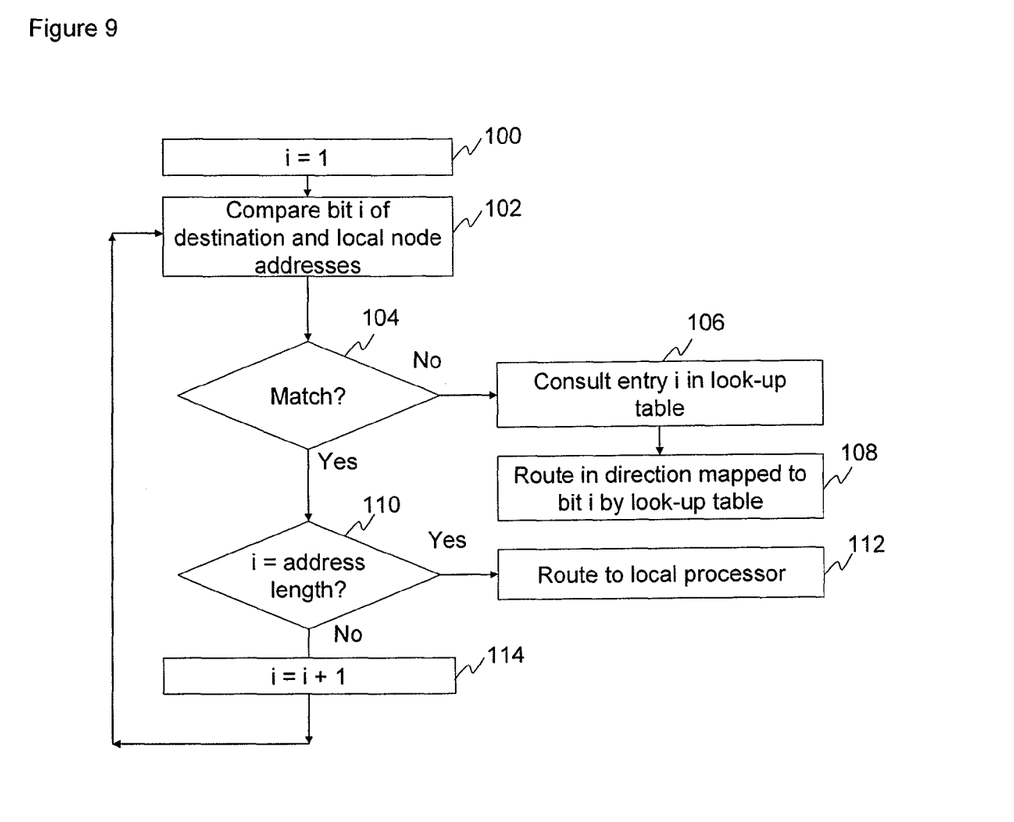
FIG. 9 is a flow chart showing a routing method.

FIG. 9 is a flow chart showing a method according to the present invention. The method begins at step 100 upon receiving the first bit of a message's destination node address at the system switch 16 of a node. For the sake of description, the address bit under consideration at any given time is referred to here as bit number i. At step 102, the $i^{th}$ bit of the destination node address is compared with the $i^{th}$ bit of the local node address. At step 104, the method branches depending on whether the $i^{th}$ bit of the destination address matches the local address. If they do not match, the method proceeds to step 106 in which the look-up table is consulted to determine the direction mapped against the $i^{th}$ bit. In step 108, the message is routed in that direction. If the $i^{th}$ bits of the destination and local addresses do match however, the method instead proceeds to step 110 in which it is determined whether the last bit of the node address has been reached. If so, the message has arrived at its destination and the method branches to step 112 in which the message is routed to a local processor. If the last bit has not been reached however, the method moves on at step 114 to consider the next address bit and repeats the method from step 102.

Figure 10:
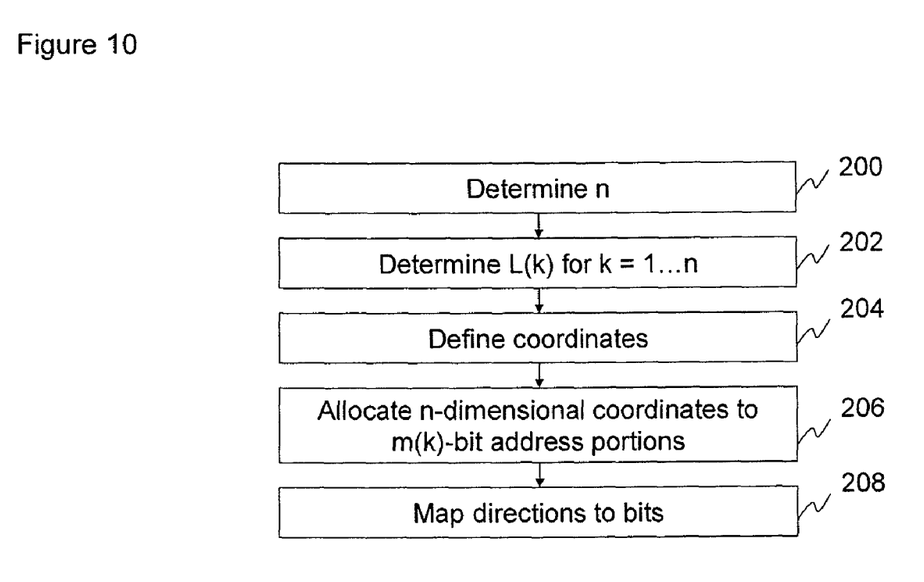
FIG. 10 is a flow chart showing a method of allocating addresses and routing directions.

From the above description, a pattern also emerges for a preferred method of addressing nodes and allocating corresponding look-up tables. This is described with reference to the flow chart of FIG. 10. In step 200, the number of dimensions n in the array is determined. In step 202 the maximum extent L(k) of the array is determined for each dimension k= 1 . . . n, where L is measured in number of nodes. In step 204, coordinates are defined in each of the dimensions k=1 . . . n. The coordinates are numbered sequentially in binary and must cover a length of at least L(k). The position of each node can then be described by a respective coordinate in each of the n dimensions. In step 206, an address portion of m(k) bits is allocated for addressing each node along each dimension k= 1 . . . n, with the constraint $2^{m(k)} \geq L(k)$, and the node's coordinates along the dimension k can thus be stored in the respective m(k)-bit address portion. In step 208, the look-up tables for each node are derived, by mapping directions to node address bits. For each address portion of each node in the array, this involves mapping a respective first direction (e.g. right, down, backwards, yellow) onto any bits of value zero and a respective second direction (e.g. left, up, forwards, green) onto any bits of value one.

For example, referring back to FIG. 7, the addresses and corresponding look-up tables are allocated as follows. First, it is noted that the array is three-dimensional and has a maximum extent of 3×3×2 nodes. A side of three nodes requires a two-bit address portion because $2^1 < 3 < 2^2$. A side of two nodes only requires a one-bit address portion. Therefore the array uses five-bit addresses to address the nodes, with the two most significant bits used to address the node in the left-right direction, the third and fourth most significant bits used to address the nodes in the up-down direction, and the least significant bit in the forwards-backwards direction. To derive the look-up table, a 0 and 1 are then mapped to right and left respectively in the two most significant bits, down and up respectively in the third to fourth most significant bits, and backwards and forwards respectively in the least significant bit.

It will be appreciated that the above embodiments are described only by way of example. In other embodiments, other addressing patterns may be apparent to a person skilled in the art. Further, the order of the most to least significant bits can be changed so that the message is first routed by plane then row then column, or by row then plane then column, etc. Further, the routing look-up table could be replaced by less preferred options such as a routing algorithm. Other configurations can also be implemented by a person skilled in the art, for example with arrays of different sizes, shapes and numbers of dimensions, including irregular arrays which do not form convenient geometric shapes and also arrays having tree type formations. The scope of the invention is not limited by the described embodiments, but only by the following claims.

The invention claimed is:

1. An array of processor nodes, each node having a respective local node address identifying it within the array, each local node address comprising a plurality of bits having an order of addressing significance from most to least significant, and each node comprising:
   a mapping device configured to map each of said bits of the local node address onto a respective routing direction;
   a switch arranged to receive a message having a destination node address identifying a destination node, the switch comprising: a comparing component configured to compare the local node address to the destination node address in order to identify the most significant non-matching bit; and a routing component configured to route the message to another node, on the condition that the local node address does not match the destination node address, in the direction mapped to the most significant non-matching bit of the local node address by the mapping device.

2. The array of claim 1, wherein the mapping device comprises a routing look-up table.

3. The array of claim 2, wherein the routing look-up table is soft-programmable.

4. The array of claim 1, wherein the mapping device is operative to run a routing algorithm.

5. The array of claim 1, wherein each node comprises at least one local processor, and the switch is configured to route the message to one of the local processors on the condition that the local node address matches the destination node address.

6. The array of claim 1, wherein the destination node address is the earliest part of the message to be received by the switch.

7. The array of claim 1, wherein the destination node address is received by the switch in order from most-significant bit to least-significant bit.

8. The array of claim 1, wherein the array is at least two-dimensional.

9. The array of claim 8, wherein the array is at least three-dimensional.

10. The array of claim 9, wherein the array is at least four-dimensional.

11. The array of claim 1, wherein the switch is configured to discard the destination node address once a match is detected and before routing the message to a processor.

12. The array of claim 1, wherein at least one node comprises a plurality of processors, wherein the message further comprises a destination processor address identifying a destination processor within the node, and wherein the switch is configured to route the message to the destination processor on the condition that the destination node address matches the local node address.

13. The array of claim 12, wherein the switch is configured to discard the destination processor address before routing the message to the destination processor.

14. The array of claim 1, wherein at least one processor of at least one node comprises a plurality of I/O channels, wherein the message further comprises a destination channel address identifying a destination channel within the processor, and wherein the switch is configured to route the message to the destination channel on the condition that the destination node address matches the local node address.

15. The array of claim 14, wherein the switch is configured to discard the destination channel address before routing the message to the destination channel.

16. The array of claim 1, wherein the switch is configured to discard one or more bits from the destination node address once those bits match with the local node address.

17. A method of routing messages in an array of processor nodes, each node having a respective local node address identifying it within the array, and each local node address comprising a plurality of bits having an order of addressing significance from most to least significant, the method comprising:
receiving at a node a message comprising a destination node address;
comparing the local node address to the destination node address to identify the most significant non-matching bit; and
on the condition that the local node address does not match the destination node address, consulting a mapping means which maps each bit of the local node address onto a respective routing direction, and routing the message to another node in the direction mapped to the most-significant non-matching bit of the local node address by the mapping means.

18. The method of claim 17, wherein the mapping means comprises a routing look-up table.

19. The method of claim 18, wherein the routing look-up table is soft-programmable.

20. The method of claim 17, wherein the mapping means comprises a routing algorithm.

21. The method of claim 17, wherein each node comprises at least one processor, and the method further comprises routing the message to one of the local processors on the condition that the local node address matches the destination node address.

22. The method of claim 17, wherein a switch is arranged to receive a message having a destination node address identifying a destination node and the destination node address is the earliest part of the message to be received by the switch.

23. The method of claim 17, wherein a switch is arranged to receive a message having a destination node address identifying a destination node and the destination node address is received by the switch in order from most-significant bit to least-significant bit.

24. The method of claim 17, wherein the array is at least two-dimensional.

25. The method claim 24, wherein the array is at least three-dimensional.

26. The method of claim 25, wherein the array is at least four-dimensional.

27. The method of claim 17, further comprising: discarding the destination node address once a match is detected and before routing the message to a processor.

28. The method of claim 17, wherein at least one node comprises a plurality of processors, wherein the message further comprises a destination processor address identifying a destination processor within the node, and wherein the method further comprises routing the message to the destination processor on the condition that the destination node address matches the local node address.

29. The method of claim 28, further comprising: discarding the destination processor address before routing the message to the destination processor.

30. The method of claim 17, wherein at least one processor of at least one node comprises a plurality of I/O channels, wherein the message further comprises a destination channel address identifying a destination channel within the processor, and wherein the method further comprises routing the message to the destination channel on the condition that the destination node address matches the local node address.

31. The method of claim 30, comprising: discarding the destination channel address before routing the message to the destination channel.

32. The method of claim 17, comprising: discarding one or more bits from the destination node address once those bits match with the local node address.

* * * * *